US010321069B2

(12) United States Patent
Dawson et al.

(10) Patent No.: US 10,321,069 B2
(45) Date of Patent: Jun. 11, 2019

(54) SYSTEM AND METHOD FOR PHOTOGRAPHIC EFFECTS (71) Applicant: International Business Machines Corporation, Armonk, NY (US)

(72) Inventors: Alan B. Dawson, Winchester (GB); James P. Hodgson, Winchester (GB); Gordon D. Hutchison, Winchester (GB); Matthew B. White, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 15/496,353

(22) Filed: Apr. 25, 2017

(65) Prior Publication Data
US 2018/0309936 A1 Oct. 25, 2018

(51) Int. Cl.
*H04N 5/262* (2006.01)
*H04N 5/232* (2006.01)

(52) U.S. Cl.
CPC ....... *H04N 5/2621* (2013.01); *H04N 5/23296* (2013.01); *H04N 5/2628* (2013.01)

(58) Field of Classification Search
CPC . H04N 5/2621; H04N 5/23296; H04N 5/2628
See application file for complete search history.

(56) References Cited

U.S. PATENT DOCUMENTS

| 7,330,607 | B2 | 2/2008 | Jung et al. |
| 8,971,625 | B2 | 3/2015 | Pitts et al. |
| 2010/0220285 | A1* | 9/2010 | Simmonds ........... G02C 13/005 351/204 |
| 2012/0038796 | A1 | 2/2012 | Posa et al. |
| 2012/0195580 | A1* | 8/2012 | Itoh .......................... G01C 3/08 396/111 |
| 2015/0281585 | A1 | 10/2015 | Guldogan |
| 2015/0329045 | A1* | 11/2015 | Harris ................ G06K 9/00805 348/148 |

OTHER PUBLICATIONS

Wikipedia, "Dolly zoom", Modified on Feb. 1, 2017, 2 pages.
(Continued)

*Primary Examiner* — Twyler L Haskins
*Assistant Examiner* — Fayez Bhuiyan
(74) *Attorney, Agent, or Firm* — William H. Hartwell; Maxine L. Barasch; Keohane & D'Alessandro, PLLC (57) ABSTRACT

Disclosed embodiments provide techniques for implementation of a photographic effect. An image is acquired while in a zoom configuration. The image is divided into pixel groups. A distance is determined for each group of pixels. The groups of pixels are based on the detected distance of the group of pixels from the camera. The detected distance can be based on the autofocus module within the camera. The detected distance can be a relative distance or an absolute distance. An expansion factor is determined for each group of pixels based on the corresponding determined distance. Expanded pixel groups are created for each pixel group based on the expansion factor. The expanded pixel groups are composited together to create the processed image.

20 Claims, 9 Drawing Sheets (56) References Cited

OTHER PUBLICATIONS

Yosuke Ito et al., "Free-Viewpoint Image Synthesis From Multiple-View Images Taken With Uncalibrated Moving Cameras", IEEE 2005, pp. 29-32.
Jiangjian Xiao, "Image Based View Synthesis", 2004, 182 pages.
G. Scott Owen, "Traditional Film Camera Techniques", Feb. 8, 2000, 4 pages.
MacRumors, "A Look at LinX Camera Technology That Could Appear in Future iOS Devices", Copyright 2000-2017 MacRumors.com, LLC, 11 pages.
Lewis Painter, PC Advisor, "Huawei P9 review: An impressive Android flagship with a gorgeous design and an innovative dual-lens camera", Apr. 27, 2016, 4 pages.
Yoni Heisler, "iPhone 7 Plus camera might be more amazing than you think", Copyright 2017 BGR Media, LLC, 3 pages.

\* cited by examiner

FIG. 6B ZOOM

FIG. 6A WALK UP

FIG. 6C SIMULATED WALK UP

SYSTEM AND METHOD FOR PHOTOGRAPHIC EFFECTS

FIELD OF THE INVENTION

Embodiments of the invention relate to systems and methods for photographic effects. More specifically, embodiments pertain to systems and methods for creating the illusion of depth in photographs.

BACKGROUND

Modern cameras allow photographs to be taken either in standard mode (i.e. walk-up), or with a zoom to make the shot look closer to the subject than it really is. Zooming is becoming more commonplace, for example, in mobile phone photography, enabled by high pixel counts and optical and digital image stabilization of modern mobile devices.

Zoomed-in photos, either shot with zoom lenses or created using digital zooming, reduces natural depth perspective of the image, thereby "flattening" it. In some cases, this can be desirable and is used as a photographic effect. However, when the effect is unwanted, the photographer is left with an image that appears less dramatic than if he/she was able to approach the subject due to a lack of relative "depth" to subjects at different distances.

When a photo is taken at close range, objects that are far away appear smaller than objects that are near. This allows the natural depth to be understood from the image. Zooming tends to flatten an image. For example, in a zoomed shot of a herd of zebra, occluded ones are not smaller than unoccluded ones as they would be if instead the photographer had walked up to the herd to take the photo at close range. A viewer of the image would see the lack of depth and infer that the photographer was far from the herd when taking the shot. Thus, there exists a need for improvements in zoom photography.

SUMMARY

Disclosed embodiments provide techniques for implementation of a photographic effect. An image is acquired while in a zoom configuration. The image is divided into pixel groups. A distance is determined for each group of pixels. The groups of pixels are based on the detected distance of the group of pixels from the camera. The detected distance can be based on the autofocus module within the camera. The detected distance can be a relative distance or an absolute distance. An expansion factor is determined for each group of pixels based on the corresponding determined distance. Expanded pixel groups are created for each pixel group based on the expansion factor. The expanded pixel groups are composited together to create the processed image.

In one aspect, there is provided a computer-implemented method for creating a photographic effect, comprising: dividing an acquired image into multiple groups of pixels; determining a group distance for each group of pixels; for each group of pixels, assigning an expansion factor to the group of pixels based on the group distance; creating an expanded pixel group for each group of pixels based on the corresponding assigned expansion factor; and creating a processed image based on the acquired image, wherein the processed image comprises each expanded pixel group.

In another aspect, there is provided an electronic device for creating a photographic effect, comprising: a processor; a camera; a memory coupled to the processor, the memory containing instructions, that when executed by the processor, perform the steps of: acquiring an image from the camera; dividing the acquired image into multiple groups of pixels; determining a group distance for each group of pixels; for each group of pixels, assigning an expansion factor to the group of pixels based on the group distance; creating an expanded pixel group for each group of pixels based on the corresponding assigned expansion factor; and creating a processed image based on the acquired image, wherein the processed image comprises each expanded pixel group.

In yet another aspect, there is provided a computer program product for creating a photographic effect on an electronic computing device, the electronic computing device comprising a computer readable storage medium having program instructions embodied therewith, the program instructions executable by a processor to cause the electronic computing device to: divide an acquired image into multiple groups of pixels; determine a group distance for each group of pixels; for each group of pixels, assign an expansion factor to the group of pixels based on the group distance; create an expanded pixel group for each group of pixels based on the corresponding assigned expansion factor; and create a processed image based on the acquired image, wherein the processed image comprises each expanded pixel group.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for implementation of a photographic effect. When a camera is set to a zoom configuration, there is a tendency for images to become "flatter" with a loss of perceived depth. In contrast, a "walk-up" configuration, where the camera is moved closer to the subject with a reduced focal length can produce an image where the objects in the image are of similar size to what appears in the zoom configuration, but with increased perception of depth. Disclosed embodiments provide a technique for creating a processed image that simulates the appearance of an image acquired in a walk-up configuration from an image in a zoom configuration.

An image is acquired while in a zoom configuration. The image is divided into pixel groups. A distance is determined for each group of pixels. The groups of pixels are based on the detected distance of the group of pixels from the camera. The detected distance can be based on the autofocus module within the camera. The detected distance can be a relative distance or an absolute distance. An expansion factor is determined for each group of pixels based on the corresponding determined distance. Expanded pixel groups are created for each pixel group based on the expansion factor. The expanded pixel groups are composited together to create the processed image.

A digital camera is an electronic device that can acquire images. On a digital camera, when the image is captured, an aperture opens at the front of the camera and light streams in through the lens. A light detector, which may include, but is not limited to, a charge-coupled device (CCD) or a CMOS image sensor, captures the incoming light rays and transforms them into electrical signals.

In a digital camera, light from the photographed scene enters the camera lens. This incoming "picture" is incident upon the image sensor chip, which breaks it up into pixels. The sensor measures the color and brightness of each pixel and stores it as a number. So, a digital photograph is effectively an enormously long string of numbers describing the exact details of each pixel it contains. These numbers can be edited to alter the resulting image, including zooming in, and/or creating a simulated walk-up effect in accordance with embodiments of the invention.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, etc.

Figure 1:
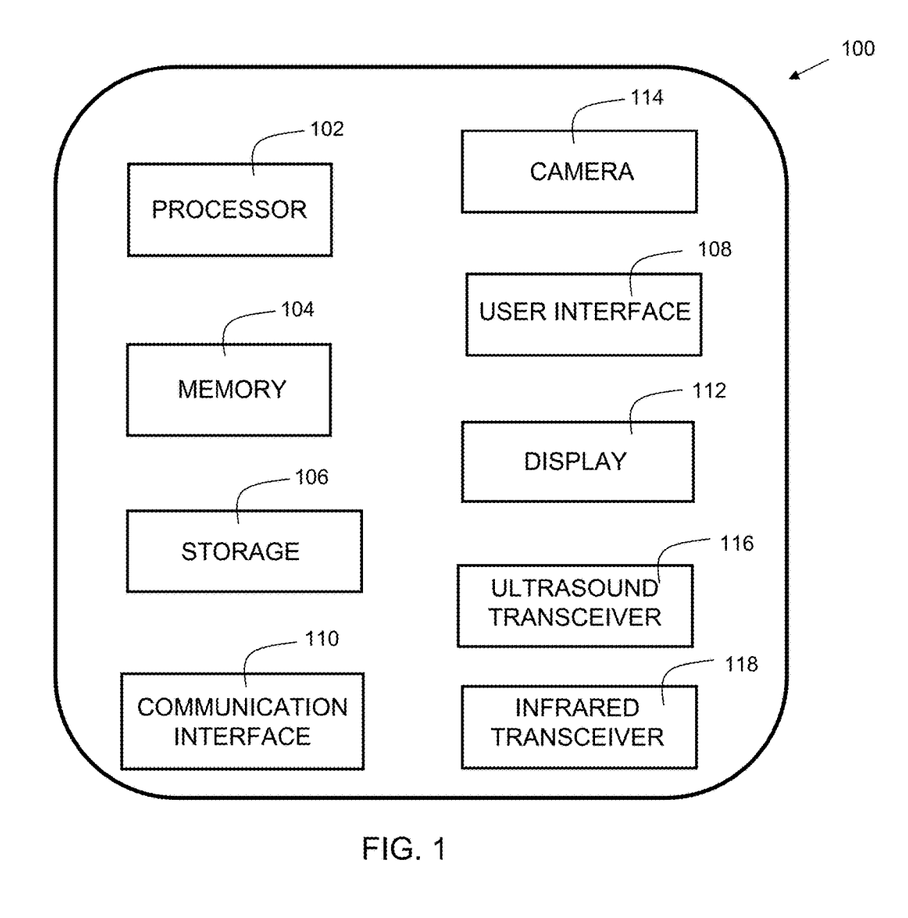
FIG. 1 is a block diagram illustrating embodiments of the present invention.

FIG. 1 is a block diagram of a device 100 in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of the present invention. In embodiments, device 100 may have multiple processors 102, and/or multiple cores per processor.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 may further include a user interface 108, examples of which include a keyboard, mouse, and/or a touch screen, incorporating a capacitive or resistive touch screen in some embodiments.

The device 100 may optionally include a communication interface 110. In embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network. Any other suitable communication interface, now known or hereafter developed, may be substituted.

The device 100 may further include a display 112. Display 112 may be a liquid crystal display (LCD), a plasma display, a cathode ray tube (CRT) display, a light emitting diode (LED) display, an organic LED (OLED) display, or other suitable display technology.

The device 100 may further include a camera 114. Camera 114 may have a shutter, a lens, an aperture, and an image sensor. Camera 114 may further have a lens finder, and/or an LCD screen for previewing and/or viewing the captured image.

In some embodiments, the device 100 may further include ultrasound transceiver 116. The ultrasound transceiver may include an ultrasonic sensor for sensing distance between the camera 114 and an object.

In some embodiments, the device 100 may further include infrared transceiver 118. The infrared (IR) transceiver may include an IR sensor for sensing distance between the camera 114 and an object.

In some embodiments, the device 100 may further include more than one camera 114. The multiple cameras may be used for determining distance between the camera 114 and an object using parallax. Various mobile devices now include multiple cameras and/or multiple lens locations, thus making this technique technically and economically feasible in such circumstances.

Figure 2:
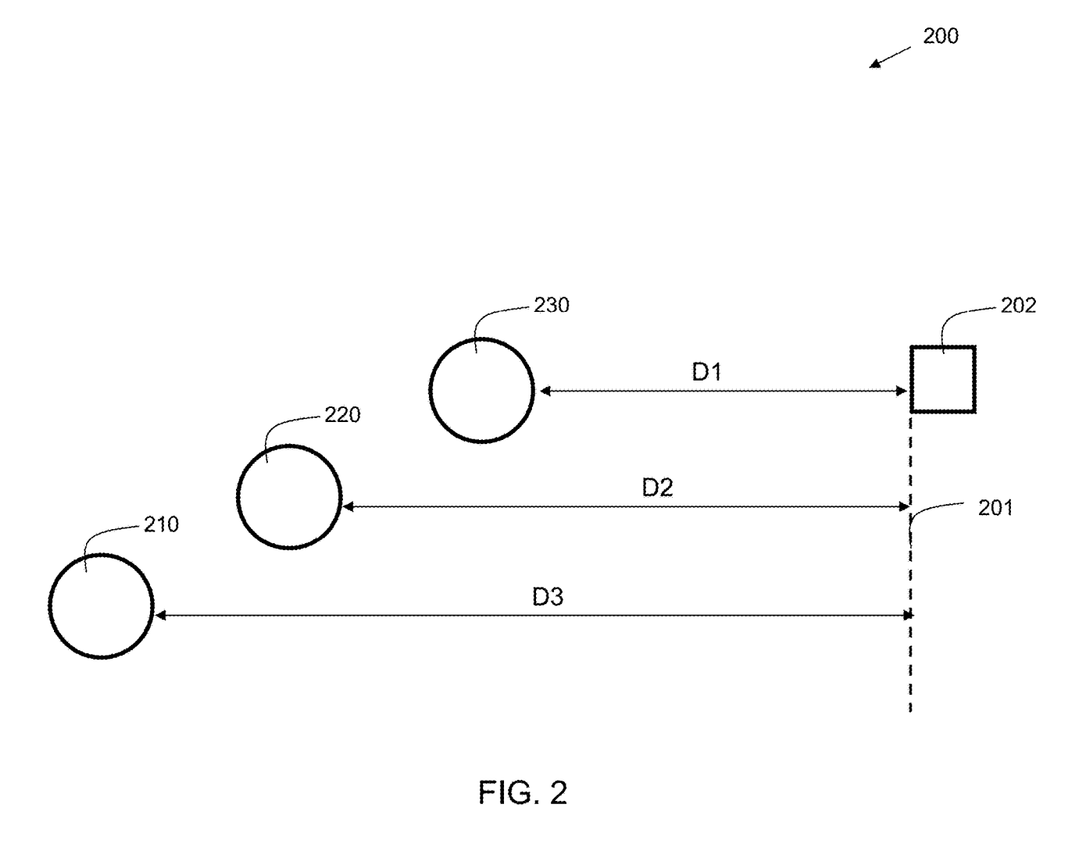
FIG. 2 shows a top-down view of objects and a camera.

FIG. 2 shows a diagram 200 illustrating a top-down view of objects to be photographed and a camera. Objects 210, 220, and 230 are shown positioned at different distances from sightline 201 of camera 202. Object 210 is at distance D1 from sightline 201. Object 220 is at distance D2 from sightline 201. Object 230 is at distance 230 from sightline 201. In the diagram 200, D1<D2<D3.

When a photo is taken from a lens on zoom, the image has a "flattened" appearance as compared to if the photographer had walked up to the objects to take the photo. Accordingly, due to the zoom, the perceived depth of objects in the image is reduced. Embodiments of the invention resize objects in an image to create the illusion of depth in a photo when the photo has been taken on zoom (in a zoom configuration). Embodiments edit the acquired image to provide a processed image that shows a simulated walk-up configuration. In order to do so, for one or more objects in the image, an expansion factor E may be computed. In the example herein, the formula is as follows:

$$Ei=Ki*S$$

Ei is the expansion factor for pixel group "i". A pixel group is a plurality of pixels making up an object in the image. The pixel group may be delineated by contrast to the pixels surrounding it. This can be determined by edge detection, contrast analysis, etc.

The expansion factor may be chosen from a range. In some embodiments, the expansion factors include expansion factors greater than or equal to 1. In some embodiments, the expansion factors range from 1 to 2. In some embodiments, the expansion factors include expansion factors greater than zero and less than 1. In some embodiments, the expansion factors range from 0.5 to 2. Any suitable range is included within the scope and spirit of embodiments of the invention.

Ki is a constant selected based on distance Di. Di is the distance between an object made up by pixel group "i" and the camera. Ki represents an amount the object is to be enlarged based on its distance from the camera. For example, if it is desired that an object be enlarged by 20% when it is positioned at a distance of 15 feet from the camera, then Ki may be 1.2 for an object 15 feet from the camera. Ki may be 1.1 for objects positioned at a distance of 25 feet from the camera. In such case, the object is enlarged by 10%. Ki may be a predetermined amount based on Di. In some embodiments, the constants Ki may be stored in the memory and/or storage of the camera device as a lookup table. In embodiments, the determined distance may be a lens working distance, which refers to the distance from the end of the lens to the subject.

In some embodiments, determining Di comprises performing an ultrasonic distance measurement. An ultrasonic sensor is a device that can measure the distance to an object by using sound waves. By recording the elapsed time between the sound wave being generated and the sound wave bouncing back, the distance between the sensor and the object is calculated.

In some embodiments, determining a distance comprises performing an infrared (IR) light distance measurement. An IR distance sensor bounces IR off objects. An analog voltage is returned, from which the distance between the sensor and the object is calculated.

In some embodiments, determining a distance comprises performing a contrast analysis. In such embodiments, the focus of the camera may be adjusted through a range of focus settings. The contrast between two surfaces is analyzed at each setting. The focus setting that results in the maximum contrast is then used to infer a distance.

In some embodiments, determining a distance comprises determining the difference in apparent position of a pixel representing the same point on the surface of an object as captured from more than one view point. The distance can be calculated using the laws of perspective, as nearer objects will appear to have a greater parallax shift in the image.

Si is a scaling factor for the image. Embodiments can include computing a scale factor based on received user input. Si is a global setting for an entire image, rather than a setting for each object in the image based on each object's distance from the camera like Ei. Si may be set by user input, for example, by a user sliding a slide control, entering a numerical value, selecting a button, etc. In some embodiments, Si may range from 1-2 with 1 being no increase in size, and 2 being a double increase in size. The range disclosed is an example, and any suitable range is included within the scope and spirit of embodiments of the invention.

Figure 3A:
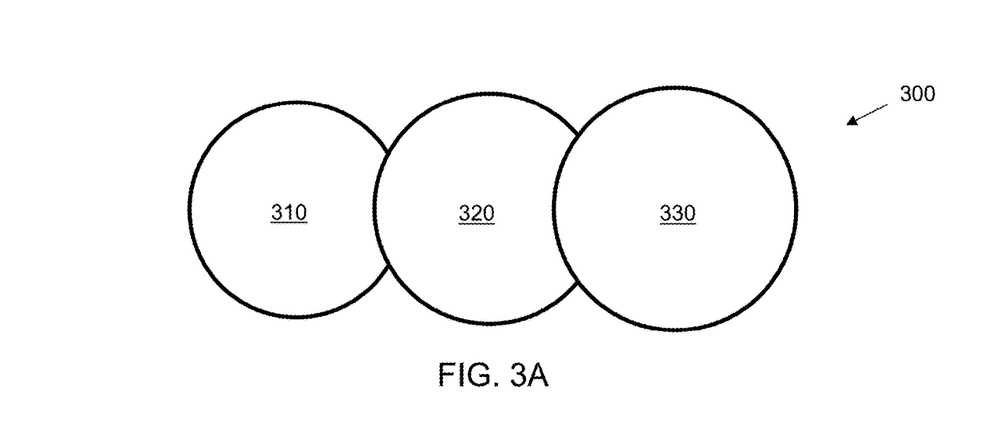
FIG. 3A shows a view of the objects with the camera in a zoom configuration.

FIG. 3A shows a diagram 300 of an image of a set of objects taken by a camera in a zoom configuration. As shown, the objects 310, 320, and 330 all appear to be fairly close to each other from a depth perspective, even though, in reality, they are not. They are "flat" because the image was taken in a zoom configuration, or the image was edited later to appear zoomed in.

Figure 3B:
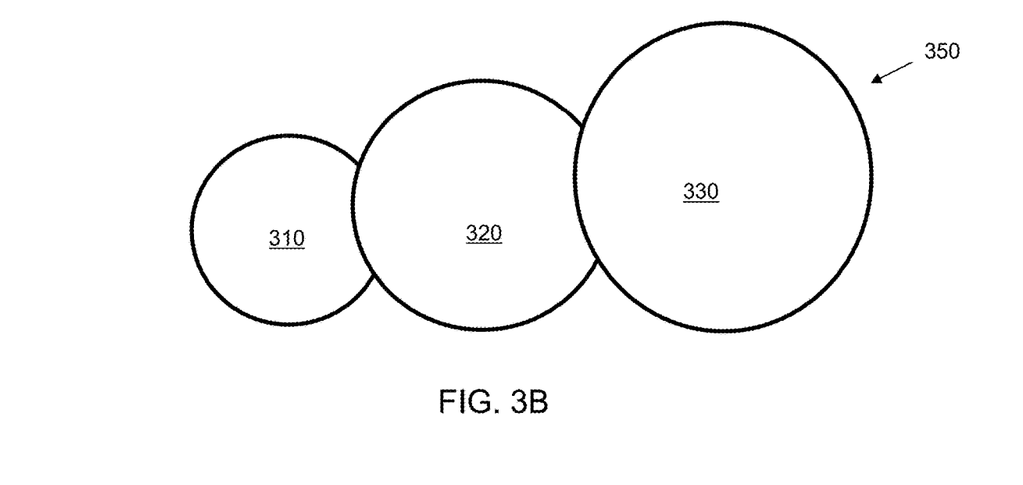
FIG. 3B shows a view of the objects with the camera in a simulated walk-up configuration using expansion factors greater than one.

FIG. 3B shows a diagram 350 of an image of the set of objects taken by a camera in a simulated walk-up configuration, in accordance with embodiments of the present invention, using expansion factors greater than one. This diagram shows the objects 310, 320, and 330 edited by embodiments of the present invention. The image is made to appear to have been taken by a photographer walking up to the objects even though the photographer did not walk-up, but instead used a simulated walk-up function that performed processing on a zoomed image to create the effect shown in FIG. 3B. Object 310 is the furthest object from the camera, and therefore, appears to be the smallest. Object 330 is the closest object to the camera, and therefore, appears to be the largest. Object 320, positioned in between object 310 and object 330 appears to be sized larger than object 310 and smaller than object 330. In this embodiment, object 310, which is a background image, appears the same size as the acquired (zoomed image). Object 320 is enlarged by a first expansion factor (e.g., 1.1). Thus, the ratio in size between object 320 and object 310 of FIG. 3B is greater than the ratio in size between object 320 and object 310 of FIG. 3A. Object 330 is enlarged by a second expansion factor (e.g., 1.2). Thus, the ratio in size between object 320 and object 330 of FIG. 3B is greater than the ratio in size between object 320 and object 330 of FIG. 3A.

Figure 3C:
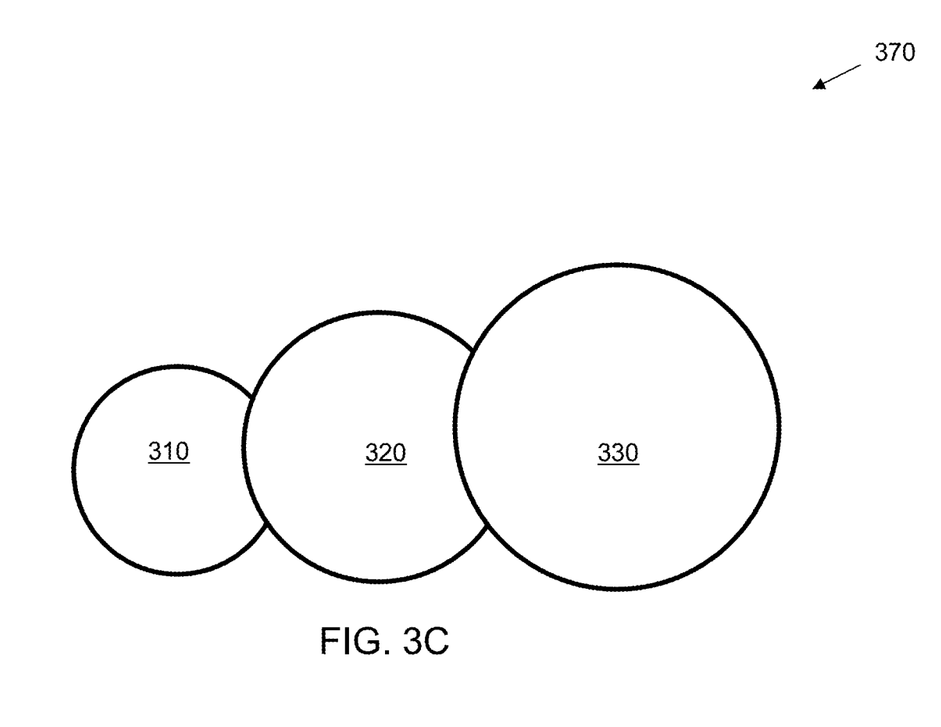
FIG. 3C shows a view of the objects with the camera in a simulated walk-up configuration using expansion factors ranging from less than one to greater than one.

FIG. 3C shows diagram 370 of a view of the set of objects with the camera in a simulated walk-up configuration, in accordance with embodiments of the present invention, using expansion factors ranging from less than one to greater than one. This diagram shows the objects 310, 320, and 330 in a processed image created by embodiments of the present invention. The image is made to appear to have been taken by a photographer walking up to the objects even though the photographer did not walk-up, but instead used a simulated walk-up function that performed processing, according to embodiments of the invention, on a zoomed image to create the effect shown in FIG. 3C. Object 310 is the furthest object from the camera, and therefore, appears the smallest. Object 330 is the closest object to the camera, and therefore, appears the largest. Object 320, positioned in between object 310 and object 330 appears to be sized larger than object 310 and smaller than object 330. In this embodiment, object 310, which is a background image, is reduced by a first expansion factor that is less than one. Thus, the ratio in size between object 320 and object 310 of FIG. 3C is greater than the ratio in size between object 320 and object 310 of FIG. 3A. Object 320 is in the middle ground of the image, and it uses an expansion factor of 1, and thus, object 320 in FIG. 3C is the same size as object 320 in the acquired image of FIG. 3A. Object 330 is enlarged by a second expansion factor that is greater than one (e.g., 1.2). Thus, the ratio in size between object 320 and object 330 of FIG. 3B is greater than the ratio in size between object 320 and object 330 of FIG. 3A. By using the expansion factors, various portions of the images can be reduced or increased in size in order to create a more pronounced depth effect.

Figure 4A:
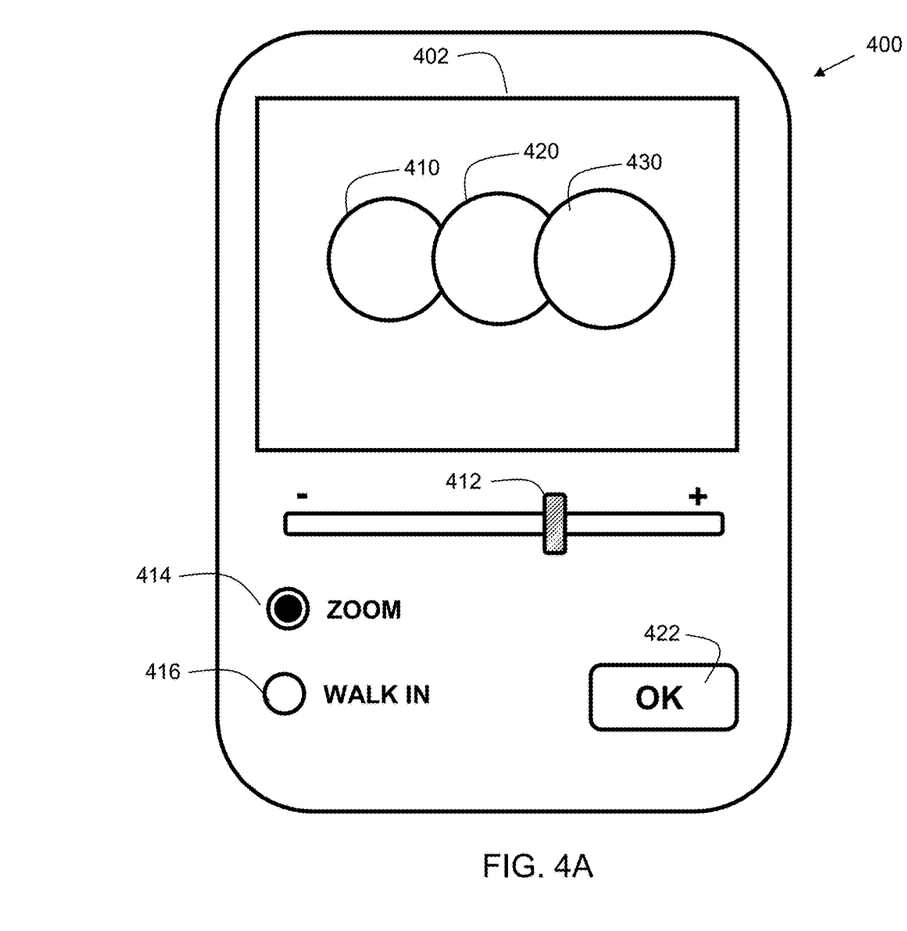
FIG. 4A shows an example of a camera in a zoom configuration.

FIG. 4A shows an example of a camera 400 in a zoom configuration. Display 402 shows what the picture currently looks like to the lens according to the directionality, distance, and any zoom settings of the camera. Radio buttons 414 and 416 allow a user to toggle between a zoom setting and a "walk-up", i.e., "no zoom" setting. In embodiments, a slide control 412 is provided for receiving user input. Slide control 412 allows a user to control the amount of zoom when the camera is in zoom mode. The left most position is "no zoom" and the right-most position is full zoom. The user can move the slider in between those points to control the amount of zoom for the camera. Camera 400 is shown in zoom configuration, as shown by the selection of radio button 414. Objects 410, 420, and 430 are shown on the display as about the same size, and accordingly, "flat." Button 422 causes the camera to acquire an image. When a user presses the button 422, camera 400 captures the image as shown on display 402.

Figure 4B:
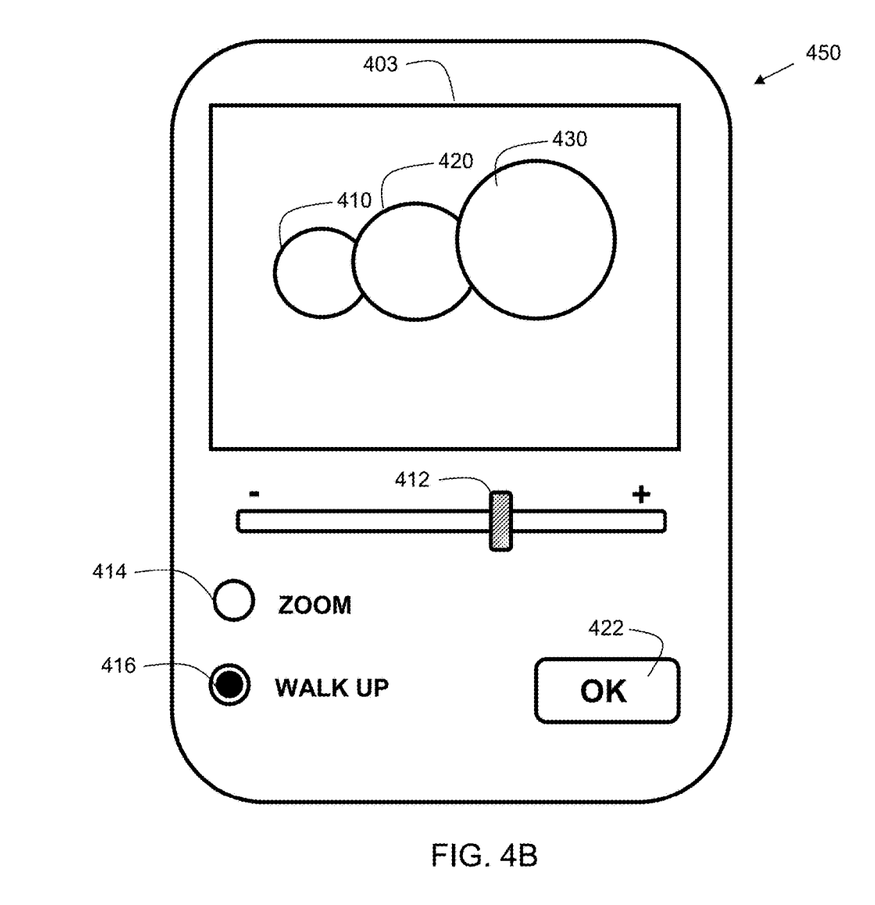
FIG. 4B shows an example of a camera in a walk-up configuration.

FIG. 4B shows an example of a camera 450 in a walk-up configuration. Camera 450 is substantially the same as camera 400 shown in FIG. 4, except it is in "walk-up" mode, as shown by the selection of radio button 416. The objects 410, 420, and 430 on the display 403 are shown more realistically, with the objects being of different sizes, and accordingly, not "flat."

Figure 4C:
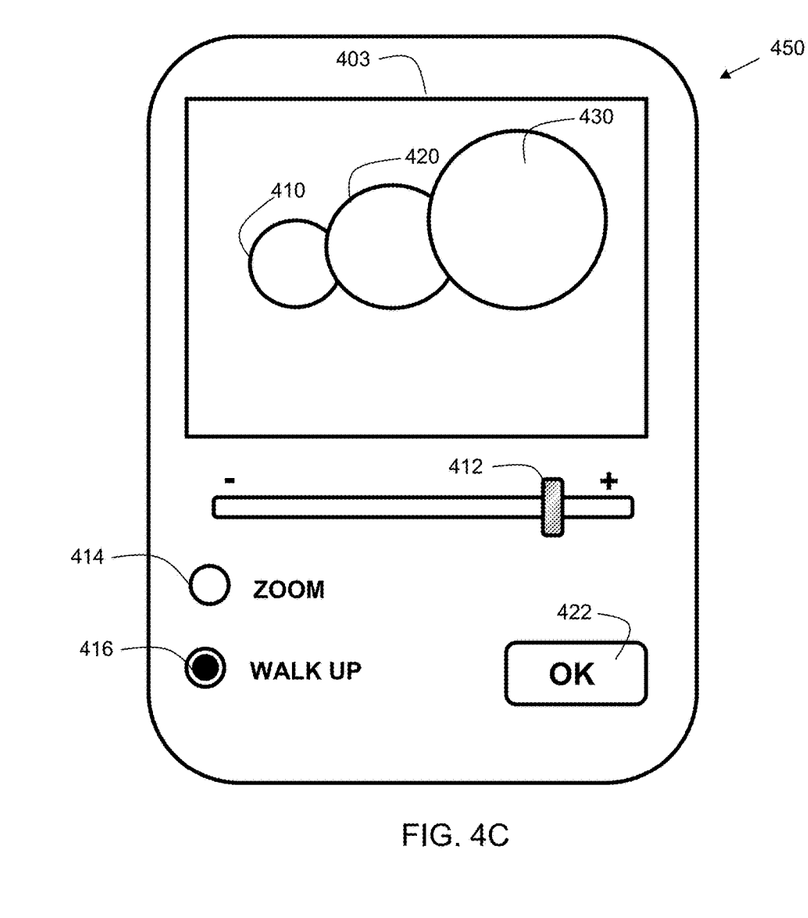
FIG. 4C shows an example of a camera in a walk-up configuration with the scale factor increased as compared with that of FIG. 4B.

FIG. 4C shows an example of a camera in a walk-up configuration with the scale factor increased as compared with that of FIG. 4B. Slider 416 is positioned further to the right as compared to its position in FIG. 4B. Accordingly, the objects are scaled up. The objects in FIG. 4C, therefore, appear larger than the objects shown in FIG. 4B.

Figure 5:
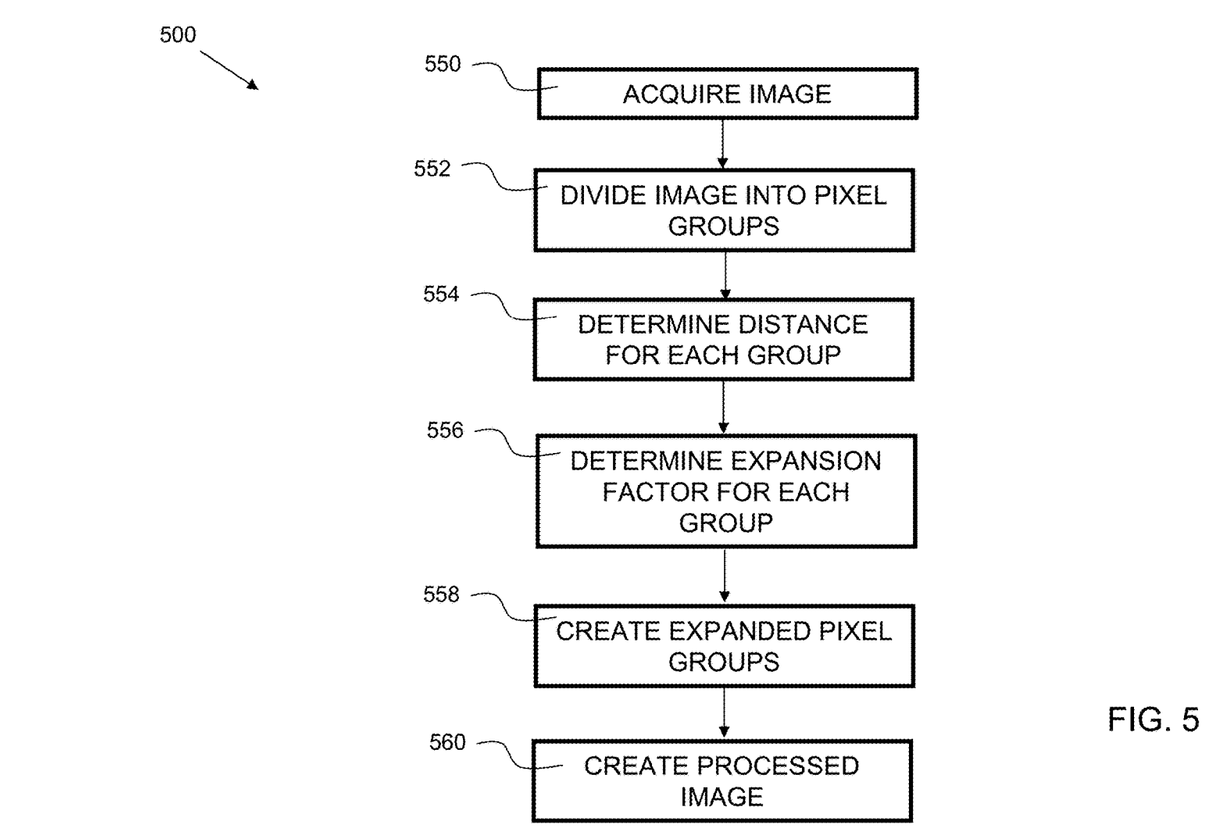
FIG. 5 is a flowchart for embodiments of the present invention.

FIG. 5 is a flowchart 500 according to embodiments of the present invention. At 550, an image is acquired. At 552, the image is divided into pixel groups. At 554, the distance for each group is determined. At 556, an expansion factor for each group is determined. At 558, expanded pixel groups are created. At 560, a processed image is created.

Figure 6A:
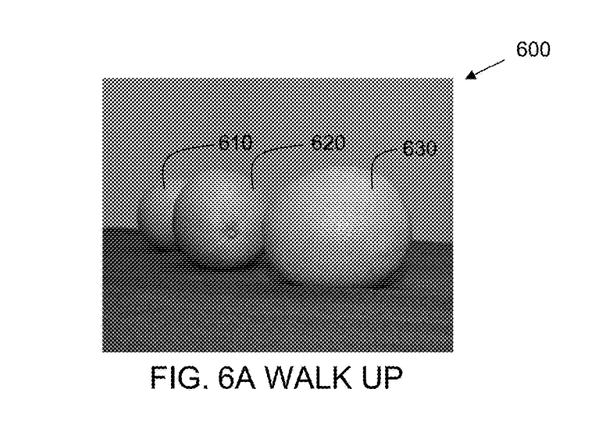
FIG. 6A shows an example of an image acquired in a walk-up configuration.

FIG. 6A shows an example of an image 600 acquired by a camera in a walk-up configuration. The photographed objects are oranges. The image was acquired using a focal length of 60 millimeters at a distance of two meters. Since the image was captured in walk-up mode, the perceived depth between each object is pronounced. In the image, orange 630 appears to be the largest with orange 610 being the smallest. Orange 620 appears smaller than orange 630 and appears larger than orange 610. From this view, orange 620 appears to be positioned behind orange 630. Similarly, orange 610 appears positioned behind orange 620.

Figure 6B:
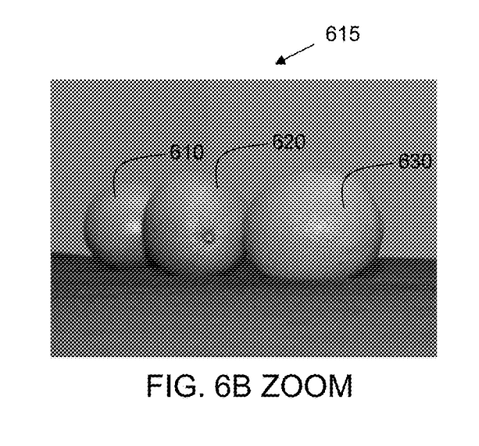
FIG. 6B shows an example of an image acquired in a zoom configuration.

FIG. 6B shows an example of an image 615 of the oranges acquired in a zoom configuration. The image was acquired using a focal length of 200 millimeters at a distance of six meters. The perceived depth between each object is reduced as compared with image 6A. Oranges 610, 620, and 630 appear closer to one another, rather than orange 620 and 610 being lined up behind orange 630, even though FIG. 6A and FIG. 6B are photographs of the same scene. That is, the objects were not moved between the acquiring of image 600 and image 615. Furthermore, image 600 and image 615 were acquired from a similar angle. The main differences between the acquisition of image 600 and image 615 are the focal length and lens working distance.

Figure 6C:
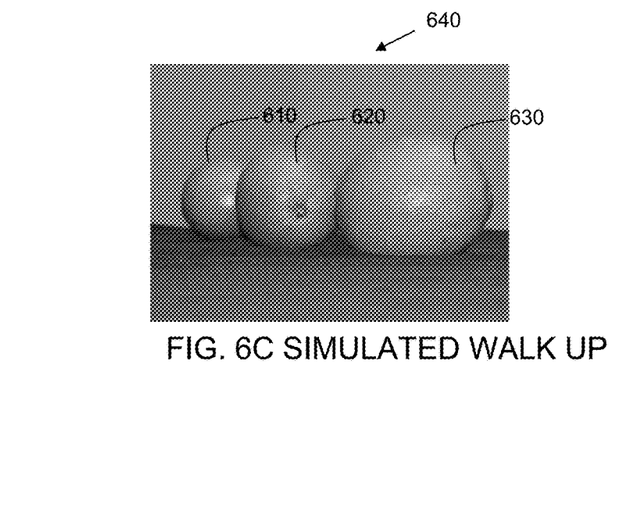
FIG. 6C shows an example of a processed image showing a simulated walk-up configuration.

FIG. 6C shows an example of a processed image 640 showing a simulated walk-up configuration applied to image 615 of FIG. 6B, according to embodiments of the present invention. The processed image used image 615 as an input, and multiple pixel groups were created and expanded based on distance, providing an improved measure of perceived depth between each object as compared with image 615. In image 640, three pixel groups are used. A first pixel group includes orange 630, and has an expansion factor of 1.2. A second pixel group includes orange 620, and has an expansion factor of 1.1. The remaining objects in image 640 are in the third pixel group that uses an expansion factor of 1 (thus, leaving the size unchanged as compared with image 615 of FIG. 6B.

One property of the disclosed technique is that some areas in the zoomed image are occluded due to the zoom. Thus, in some embodiments, the expansion of the pixels is constrained to be within the limit of the distance to the center of the image that is covered by the expanded pixels that lie between this pixel and the center. Therefore, 'new' pixels that are occluded from the physical point of view are not revealed. In this way, unnatural artifacts are reduced while using the photographic effect of disclosed embodiments.

In embodiments, the center of the image is taken as the destination point for purposes of computing the walk-up zoom effect. In this embodiment, the center of the image is selected and the walk-up effect is performed as if the viewpoint is moving from the current viewpoint in a straight line towards the center of the image. In some embodiments, a different point other than the center could be used for the walk-up zoom destination point.

Other embodiments take account of the shape of an object within the image taken to approximate the ground surface plane, estimate the position of the viewpoint relative to that ground plane, and then take the center of the zoom point to be a distant point that is still in a similar relative position to the ground.

Once the central point for the walk-up zoom effect is selected, an individual picture area (pixel) can be processed as follows. A cross-section of the image is taken from that pixel point to the center of the image, the center of the image being taken as point "0". Such point is taken as point x along the line from the center to this point at this angle, which can be referred to as (x, angle) in a form of polar coordinates.

The mapping that is applied takes the pixel as (x, angle) and maps it to a point referred to as x' which is greater than or equal to x on the same angle from the center and also one pixel may map to a range such that:

(x, angleA)→(x', x", angleA)

Where (x"-x') gives the number of pixels that the pixel at X is going to be zoomed or scaled up to cover. Note that no pixel will be mapped to an X value less than its original value.

To calculate the pixel properties, such as color and brightness for a particular pixel (y, angle), the following procedure is performed:

To obtain pixel properties for (y, angle):
for x=0 until x=edge of image, increment X by 1 each time
    apply mapping function m(x, angle image) to obtain (x', x", angle)
    if (x'<=y and x">=y)//this is the found range
    then
        return calculated (x', x", angle)
end for loop 'for x=0 until x=edge of image, increment X by 1 each time'

The mapping function takes account of the distance of the pixel from the camera. It can be possible that there may be two or more possible pixels in the original image that would be scaled to map to the resulting image. When this is the case, the pixel that is 'closest' to the viewer is the one that has its properties passed to the final mapping result. The intent is to avoid producing a pixel in the resultant image that does not have any 'source' pixel in the original image. For particular images, this could occur only for particular amounts of 'zoom'. Images that contain objects that are hollow, concave, or hooked will tend to be prone to this artifact.

Embodiments accommodate these situations by identifying the problematic areas that occur when z(x) (where z(x) represents the distance from the viewer to the pixel at point x on the radial intersection being processed) is not strictly increasing with respect to x (i.e., the problematic areas occur when more central parts of the image are further away than those that are less central—for example, a centered letter U or O could be prone to this problem.) However, in practice, it is a very common scenario to have the subject centered in an image. Thus, there are many practical scenarios in which the aforementioned undesirable artifacts will not occur.

Embodiments can include a second stage of the mapping M that accommodates the aforementioned issues. Embodiments may avoid the problem of unnatural artifacts by using a higher zoom until a solid area of the zoomed, close object obscures any problem areas.

There are numerous actions that can be taken by disclosed embodiments as the user takes the sliding zoom scale (e.g., 412 of FIG. 4B) through areas that would attempt to display portions of the scene not included in the original image.

Embodiments may employ one or more of the techniques listed below:

1. The pixels can be grayed out;
2. The original pixels for the location can be used;
3. Pixel attributes such as color and tone can be averaged relative to distance from each known edge;
4. Differential scaling across the X range to smoothly stretch adjacent areas and 'pull together' the valid two edges of the invalid region to close it up.

In this way, unnatural artifacts are reduced. When unnatural artifacts do occur, one of the four processing techniques mentioned above can be used to further hide/blend the unnatural artifacts to make them less noticeable.

As can now be appreciated, disclosed embodiments enable providing a processed image that approximates the appearance of a walk-up image. This allows a user to create the effect of walking closer to a subject without having to actually do so. Thus, a wide variety of photograph types, such as landscapes, group photographs, still life photographs, and city skylines can benefit from the availability of such an effect to create interesting images.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for creating a photographic effect, comprising:
dividing an acquired image into multiple groups of pixels;
determining a group distance for a first group of pixels, wherein the first group of pixels represents a first object depicted in the acquired image;
determining a group distance for a second group of pixels, wherein the second group of pixels represents a second object depicted in the acquired image;
assigning a first expansion factor to the first group of pixels based on the group distance for the first group of pixels;
assigning a second expansion factor to the second group of pixels based on the group distance for the second group of pixels, wherein the second expansion factor is a value different from a value of the first expansion factor;
resizing the first group of pixels based on the assigned first expansion factor;
resizing the second group of pixels based on the assigned second expansion factor; and
creating a processed image based on the acquired image, wherein the processed image comprises the first resized group of pixels and the second resized group of pixels.

2. The method of claim 1, wherein the expansion factors include expansion factors greater than or equal to 1.

3. The method of claim 2, wherein the expansion factors range from 1 to 2.

4. The method of claim 1, wherein the expansion factors include expansion factors greater than zero and less than 1.

5. The method of claim 1, wherein the expansion factors range from 0.5 to 2.

6. The method of claim 1, further comprising computing a scale factor based on received user input.

7. The method of claim 6, wherein the received user input comprises a slide control.

8. The method of claim 1, wherein the determining the group distance comprises performing a contrast analysis.

9. The method of claim 1, wherein the determining the group distance comprises performing an ultrasonic distance measurement.

10. The method of claim 1, wherein the determining the group distance comprises performing a parallax analysis using multiple images.

11. An electronic device for creating a photographic effect, comprising:
a processor;
a camera;
a memory coupled to the processor, the memory containing instructions, that when executed by the processor, perform the steps of:
acquiring an image from the camera;
dividing the acquired image into multiple groups of pixels;
determining a group distance for a first group of pixels, wherein the first group of pixels represents a first object depicted in the acquired image;
determining a group distance for a second group of pixels, wherein the second group of pixels represents a second object depicted in the acquired image;
assigning a first expansion factor to the first group of pixels based on the group distance for the first group of pixels;
assigning a second expansion factor to the second group of pixels based on the group distance for the second group of pixels, wherein the second expansion factor is a value different from a value of the first expansion factor;
resizing the first group of pixels based on the assigned first expansion factor;
resizing the second group of pixels based on the assigned second expansion factor; and
creating a processed image based on the acquired image, wherein the processed image comprises the first resized group of pixels and the second resized group of pixels.

12. The electronic device of claim 11, wherein the memory further contains instructions, that when executed by the processor, perform the step of assigning expansion factors greater than or equal to 1.

13. The electronic device of claim 12, wherein the memory further contains instructions, that when executed by the processor, perform the step of assigning expansion factors ranging from 1 to 2.

14. The electronic device of claim 11, wherein the memory further contains instructions, that when executed by the processor, perform the step of assigning expansion factors greater than zero and less than 1.

15. The electronic device of claim 11, wherein the memory further contains instructions, that when executed by the processor, perform the step of assigning expansion factors ranging from 0.5 to 2.

16. The electronic device of claim 11, wherein the memory further contains instructions, that when executed by the processor, perform the step of computing a scale factor based on received user input.

17. The electronic device of claim 11, wherein the determining the group distance comprises performing a contrast analysis.

18. The electronic device of claim 11, wherein the determining the group distance comprises performing an ultrasonic distance measurement.

19. The electronic device of claim 11, wherein the determining the group distance comprises performing a parallax analysis using multiple images.

20. A computer program product for creating a photographic effect on an electronic computing device, the electronic computing device comprising a computer readable storage medium having program instructions embodied therewith, the program instructions executable by a processor to cause the electronic computing device to:
divide an acquired image into multiple groups of pixels;
determine a group distance for a first group of pixels, wherein the first group of pixels represents a first object depicted in the acquired image;
determine a group distance for a second group of pixels, wherein the second group of pixels represents a second object depicted in the acquired image;
assign a first expansion factor to the first group of pixels based on the group distance for the first group of pixels;
assign a second expansion factor to the second group of pixels based on the group distance for the second group of pixels, wherein the second expansion factor is a value different from a value of the first expansion factor;

resize the first group of pixels based on the assigned first expansion factor;

resize the second group of pixels based on the assigned second expansion factor; and create a processed image based on the acquired image, wherein the processed image comprises the first resized group of pixels and the second resized group of pixels.

* * * * *